(12) United States Patent
Chhiba et al.

(10) Patent No.: US 12,469,861 B2
(45) Date of Patent: Nov. 11, 2025

(54) DATA CENTER BALANCE OF PLANT INTEGRATED INTO FUEL CELL SYSTEM DESIGN

(71) Applicant: Google LLC, Mountain View, CA (US)

(72) Inventors: Priya Chhiba, Atlanta, GA (US); Thomas Kowalski, Ben Lomond, CA (US); Varun Sakalkar, Redwood City, CA (US); Angad Sandhu, Reno, NV (US); Hariharan Subramanian, Everett, WA (US)

(73) Assignee: Google LLC, Mountain View, CA (US)

( * ) Notice: Subject to any disclaimer, the term of this patent is extended or adjusted under 35 U.S.C. 154(b) by 291 days.

(21) Appl. No.: 18/198,896

(22) Filed: May 18, 2023

(65) Prior Publication Data

US 2024/0072272 A1    Feb. 29, 2024

Related U.S. Application Data

(60) Provisional application No. 63/401,287, filed on Aug. 26, 2022.

(51) Int. Cl.
*H01M 8/04029* (2016.01)
*G06F 1/18* (2006.01)
(Continued)

(52) U.S. Cl.
CPC ........ *H01M 8/04029* (2013.01); *G06F 1/189* (2013.01); *G06F 1/206* (2013.01);
(Continued)

(58) Field of Classification Search
CPC combination set(s) only.
See application file for complete search history.

(56) References Cited

U.S. PATENT DOCUMENTS

| 8,937,405 B2 | 1/2015 | Park |
| 9,019,700 B2 * | 4/2015 | Ballantine ................. G06F 1/30 |
| | | 361/679.48 |

(Continued)

FOREIGN PATENT DOCUMENTS

| CN | 207459824 U | 6/2018 |
| CN | 111029629 A | 4/2020 |

(Continued)

OTHER PUBLICATIONS

Extended European search report for European Appl. No. 23186175.8 dated Feb. 13, 2024. 10 pages.

(Continued)

*Primary Examiner* — Lisa Lea-Edmonds
(74) *Attorney, Agent, or Firm* — Lerner David LLP

(57) ABSTRACT

An energy system may include data center computer equipment, a data center power system configured to simultaneously provide power for operation of the data center equipment and power for cooling the data center equipment, fuel cells configured to provide power to the data center power system, an on-site battery storage configured to provide backup power and power conditioning to the fuel cells, an on-site hydrogen storage to provide fuel to the fuel cells, and an excess heat recovery connection configured to transfer a liquid from the data center power system to provide cooling to the fuel cells.

20 Claims, 3 Drawing Sheets

(51) Int. Cl.
  *G06F 1/20* (2006.01)
  *H01M 8/04082* (2016.01)
  *H01M 8/10* (2016.01)
  *H01M 8/1018* (2016.01)
  *H05K 7/20* (2006.01)
(52) U.S. Cl.
  CPC ..... *H01M 8/04208* (2013.01); *H01M 8/1018* (2013.01); *H05K 7/2079* (2013.01); *H01M 2008/1095* (2013.01); *H01M 2250/10* (2013.01)

(56) References Cited

U.S. PATENT DOCUMENTS

| | | | | |
|---|---|---|---|---|
| 9,089,077 | B2* | 7/2015 | Ballantine | H02J 3/381 |
| 10,203,735 | B2 | 2/2019 | Gross et al. | |
| 10,615,436 | B2* | 4/2020 | Cader | H01M 8/0656 |
| 10,813,254 | B2* | 10/2020 | Marazzo | F03D 9/28 |
| 11,656,665 | B2* | 5/2023 | Heydari | G06F 1/20 |
| | | | | 700/300 |
| 11,822,398 | B2* | 11/2023 | Heydari | H05K 7/20781 |
| 11,829,215 | B2* | 11/2023 | Heydari | H05K 7/2079 |
| 11,997,830 | B2* | 5/2024 | Heydari | G06F 1/20 |
| 12,089,378 | B2* | 9/2024 | Davis | H05K 7/20836 |
| 12,114,469 | B2* | 10/2024 | Heydari | H05K 7/20781 |
| 12,156,382 | B2* | 11/2024 | Oxley | H05K 7/1497 |
| 2004/0219415 | A1* | 11/2004 | Brignone | H01M 8/04186 |
| | | | | 323/318 |
| 2004/0265662 | A1* | 12/2004 | Brignone | H01M 8/04186 |
| | | | | 429/442 |
| 2005/0200205 | A1* | 9/2005 | Winn | H02J 9/08 |
| | | | | 307/64 |
| 2009/0072624 | A1 | 3/2009 | Towada | |
| 2013/0163192 | A1* | 6/2013 | Ballantine | H05K 7/20745 |
| | | | | 361/679.48 |
| 2014/0048235 | A1* | 2/2014 | Kamaludeen | F01K 13/00 |
| | | | | 165/104.33 |
| 2018/0107260 | A1* | 4/2018 | Cifala | G06F 1/26 |
| 2018/0316030 | A1* | 11/2018 | Cader | C25B 15/02 |
| 2019/0146565 | A1 | 5/2019 | Cader et al. | |
| 2023/0284422 | A1* | 9/2023 | Heydari | H05K 7/20272 |
| | | | | 361/679.53 |
| 2023/0284424 | A1* | 9/2023 | Heydari | H05K 7/20509 |
| | | | | 361/679.53 |
| 2023/0335997 | A1* | 10/2023 | Cella | G06N 3/08 |
| 2023/0380113 | A1* | 11/2023 | Oxley | H05K 7/20745 |
| 2024/0014416 | A1* | 1/2024 | Tao | H01M 16/006 |
| 2024/0072272 | A1* | 2/2024 | Chhiba | H01M 8/04208 |

FOREIGN PATENT DOCUMENTS

| | | |
|---|---|---|
| CN | 110365281 B | 10/2020 |
| CN | 111816951 A | 10/2020 |
| CN | 112186289 A | 1/2021 |
| CN | 212381591 U | 1/2021 |
| CN | 112334857 A | 2/2021 |
| CN | 112462919 A | 3/2021 |
| CN | 113130941 A | 7/2021 |
| CN | 108292768 B | 11/2021 |
| CN | 111465264 B | 7/2022 |
| KR | 20210119503 A | 10/2021 |

OTHER PUBLICATIONS

Guizzi, G., et al., "Fuel Cell-Based Cogeneration System Covering Data Centers' Energy Needs", Energy, vol. 41, No. 1, May 2012. 37 pages.

Dogterom, J., et al., "Powering Change with Fuel Cells in the Telecommunication Industry", Intelec 05-Twenty-Seventh International Telecommunications Conference, IEEE, Sep. 2005. pp. 401-405.

* cited by examiner

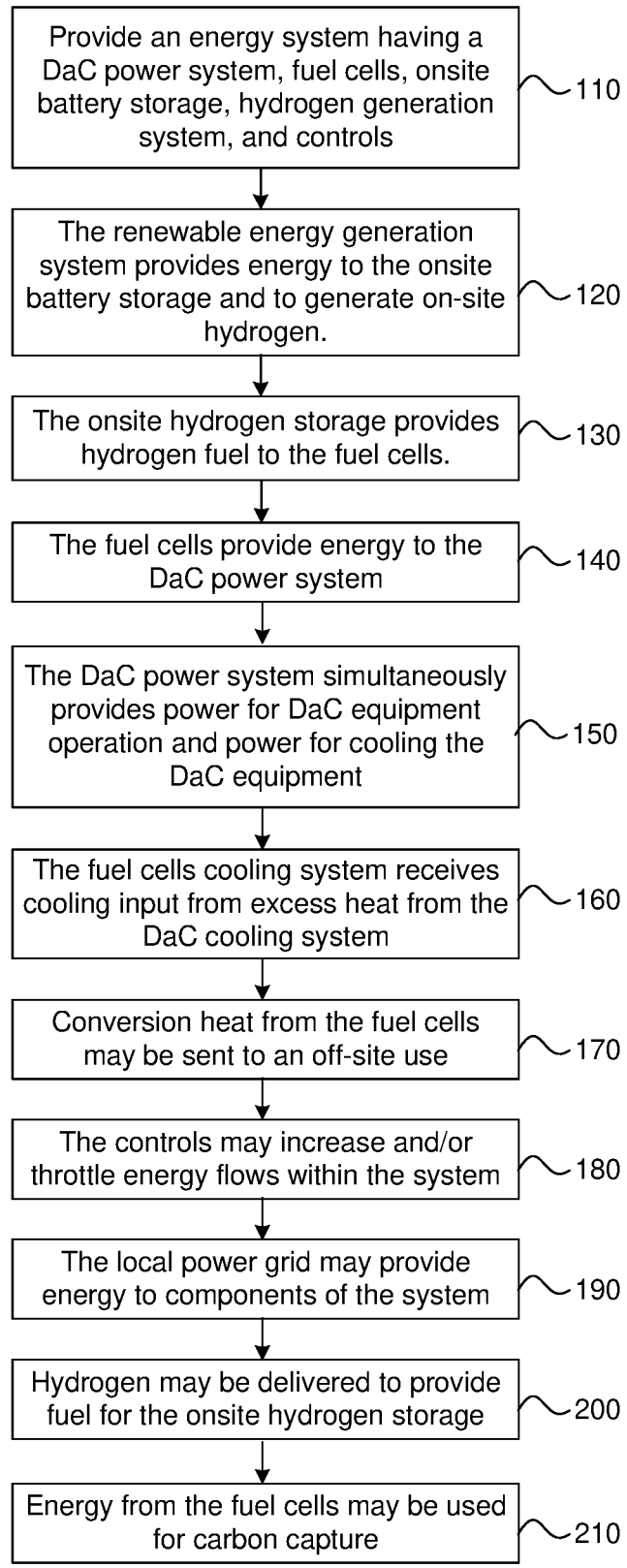

DATA CENTER BALANCE OF PLANT INTEGRATED INTO FUEL CELL SYSTEM DESIGN

CROSS-REFERENCE TO RELATED APPLICATIONS

This application claims the benefit of the filing date of U.S. Provisional Patent Application No. 63/401,287 filed Aug. 26, 2022, the disclosure of which is hereby incorporated herein by reference.

BACKGROUND

Stationary polymer electrolyte membrane (PEM) fuel cells are being investigated as a replacement technology for data center backup diesel generators. However, stationary PEM fuel cell solutions currently available through multiple suppliers are expensive compared with diesel generators, occupy a larger footprint than diesel generators, and require larger fuel volumes than diesel generators. As such, currently available PEM fuel cell solutions are not an effective plug-and-play replacement for backup diesel generators at data centers.

Backup fuel cell power solutions available today for data centers are container-based solutions with integrated mechanical cooling systems and electrical infrastructure such as inverters, controls, transformers, and switch gears. Standard stationary fuel cell solutions today are smaller than 1 MW in capacity. Most suppliers do not have offerings in the 3.0 MW to 3.5 MW range, which is the typical power range for data center diesel engines. Supplier offerings in the MW capacity size range typically include multiple fuel cell modules or fuel cell engine blocks developed for the automobile industry, pieced together to form one unit. Compared to diesel generators, these automotive solutions are not optimized for capacity, energy density, and size for data center stationary backup power applications and can lead to increased capital expenditure and inefficiencies in performance for data center owners.

BRIEF SUMMARY

One aspect of the disclosure provides a fuel cell energy system that is electrically and mechanically integrated with the data center's electrical distribution and cooling systems. The fuel cell energy system is configured to simultaneously provide power for the operation of the data center equipment, power for cooling the data center equipment and for cooling the fuel cells. The fuel cells are fueled from an on-site hydrogen storage facility, and the fuel cell operation is integrated with an on-site battery system that is sized and configured to provide backup power and power conditioning to the operation of the fuel cells.

This disclosure proposes removing the cooling equipment (air-cooled chillers) and the electrical equipment (inverter, transformer, switchgear, etc.) from the fuel cells system and integrating the data center cooling and electrical transmission systems with the fuel cell system to reduce the capital expenditure of the equipment.

Data Center cooling system integration of PEM fuel cells will use PEM fuel cell stationary modules available on the market today, without their respective manufacturer provided cooling systems. Cooling water that has passed through the data center exits the data center at a higher temperature. This higher temperature is still suitable for providing cooling to the fuel cell module. The water that exits the fuel cell module will be at a higher temperature making the quality of heat more suitable for configuration with a heat recovery system.

The energy system may include an on-site or off-site renewable energy generation system that is either used to generate hydrogen for the fuel cells and/or used to charge the on-site battery storage system and/or used to power the data center. The energy system may include controls configured to increase or throttle energy flows from the fuel cells and batteries to the data center power system and from the renewable energy generation system to the hydrogen generation system, batteries, and data center power system. The excess heat recovery connection may be configured to provide heat energy to a carbon capture system that may be configured to capture carbon from the atmosphere. The on-site battery storage supporting fuel cells may be integrated with other data center batteries configured to provide backup power to the data center computer equipment at the start of an outage.

The energy system may include one or more inverters, transformers, or switchgear systems that may be integrated with the data center power system and with the data center computer equipment. The excess heat recovery connection may be configured to transfer heat energy to an off-site use outside of the energy system or may be configured for on-site use by converting heat to electrical energy via use of mechanisms such as nitinol engines, adsorption chillers or organic Rankine cycle engines. The data center energy system may be configured to receive energy from any or all of the fuel cells, batteries, heat recovery systems, and an electrical power grid.

Another aspect of the disclosure provides for a method of cooling a data center. The method may include providing an energy system having data center computer equipment, a data center power system, fuel cells, and an on-site battery storage. The data center power system may simultaneously provide power for operation of the data center equipment and power for cooling the data center equipment. The fuel cells may provide power to the data center power system, an on-site hydrogen storage system may provide fuel for the fuel cells, the on-site battery storage may provide backup power and power conditioning to the fuel cells, and an excess heat recovery connection may transfer a liquid from the data center power system to the fuel cells to cool the fuel cells.

The energy system may include an on-site or off-site renewable energy generation system that is used to generate hydrogen for the fuel cells and/or to charge the on-site battery storage system and/or directly power the data center. The method may include the hydrogen generating system providing hydrogen to the on-site hydrogen storage system. The energy system may have controls. The method may include the controls increasing or throttling energy flows from the renewable energy source, the fuel cells, and/or the batteries to the data center power system or from the renewable energy generation system to the hydrogen generation system, batteries, and/or data center power system. The method may include the excess heat recovery connection providing heat energy to a carbon capture system that may capture carbon from the atmosphere. The on-site battery storage may be integrated with other data center batteries that may provide operating power to the data center computer equipment.

The energy system may have one or more inverters, transformers, or switchgear systems that may be integrated with the data center power system and with the data center computer equipment. The method may include the excess heat recovery connection transferring heat energy to an off-site use outside of the energy system. The fuel cells may be stationary polymer electrolyte membrane fuel cells. The method may include a hydrogen source outside of the energy system providing hydrogen to the on-site hydrogen storage. The method may include a local electrical power grid that may provide primary electrical power simultaneously for operation of the data center equipment and cooling of the data center equipment.

BRIEF DESCRIPTION OF THE DRAWINGS

FIG. 3 is a flow chart illustrating an example method in accordance with one aspect of the disclosure.

DETAILED DESCRIPTION

The systems of the present disclosure are directed to a stationary fuel cell system for use as a primary and backup power source for a data center. In this regard, the backup data center power systems may be integrated with existing systems in the data center. For example, the following systems in the data center can be integrated into a single combined system:
1) Data Center Cooling System: The cooling system of a data center can be used to cool the fuel cell system. Cooling water exiting the data center cooling system can be routed to the fuel cell system to provide cooling to the fuel cell system. The hot water outlet from the energy system can then be used for off-site heating purposes since this will be higher temperature heat.
2) Liquid Hydrogen Cooling System: Hydrogen stored on-site is stored in the form of liquid hydrogen at cryogenic temperatures to reduce volume required for storing hydrogen. Liquid hydrogen is expanded through a vaporizer unit into gaseous hydrogen when it is supplied to the fuel cells. The expansion of liquid hydrogen can be integrated with the cooling of the fuel cell system and with the data center cooling system to reduce the overall cooling load of the data center.
3) The batteries required for startup and load conditioning of the fuel cells can be integrated with other data center batteries, resulting in a capital expenditure reduction for the overall data center system. For instance, leveraging infrastructure already within a data center may reduce the additional components required to integrate the fuel cells.
4) Electrical Infrastructure: Existing data center inverters, transformers, and switch gear systems may be integrated with the fuel cell system to reduce the overall size footprint and the capital expenditure associated with the fuel cell system.
5) Heat Recovery: Off-site applications of excess heat from the energy system can be nitinol or other shape memory alloy engines, adsorption/absorption chillers, organic Rankine cycle engines, direct air carbon capture, desalination, or other applications of process heat.

The following advantages may be realized by systems of the present disclosure: a reduction in fuel cell capital expenditure; a reduction in the overall size footprint of the fuel cell system; an overall efficiency improvement for the combined fuel cell and data center system; and development of a data center-centric stationary fuel cell system.

Figure 1:
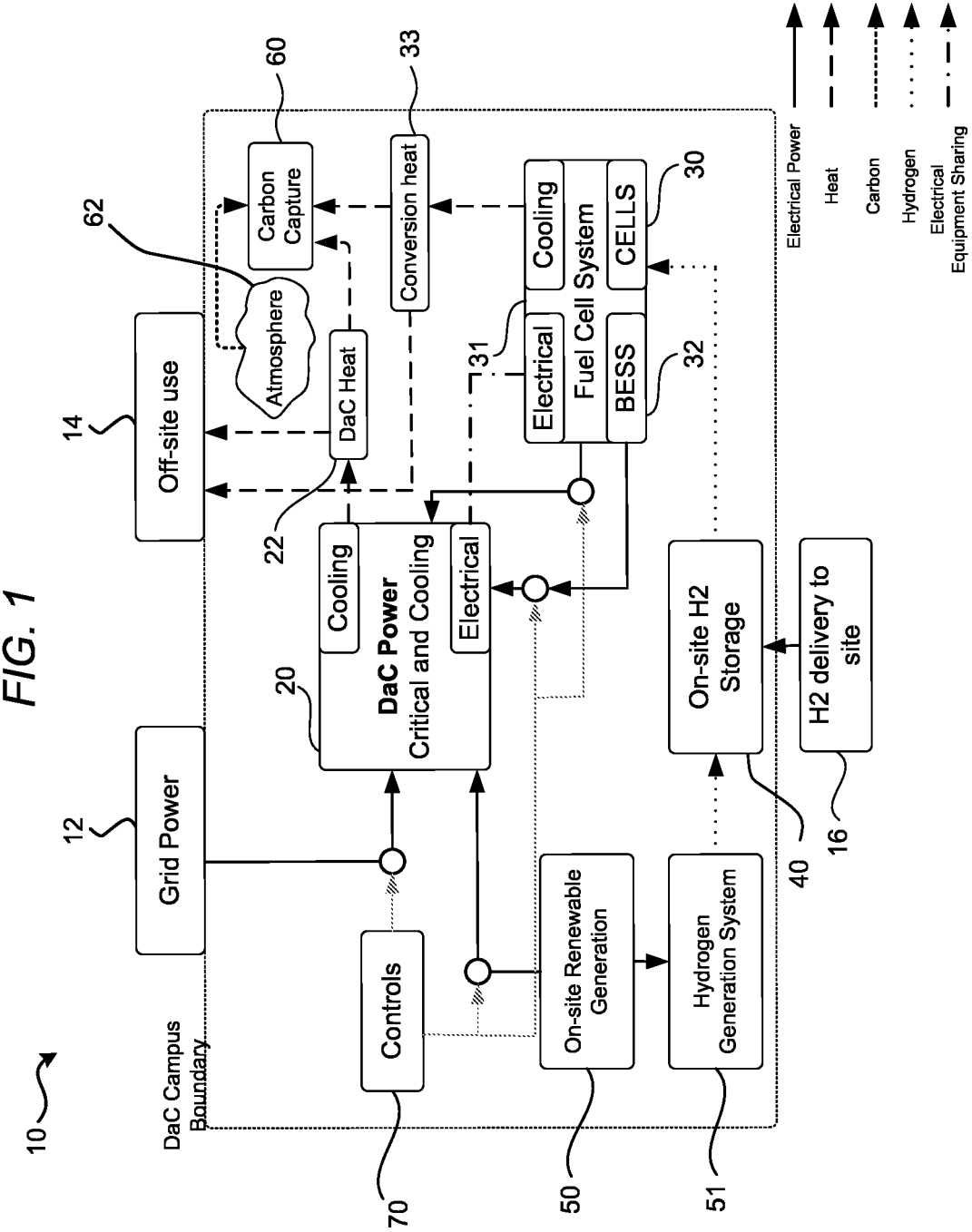
FIG. 1 shows a flowchart illustrating an energy system, in accordance with aspects of the disclosure.

Referring to FIG. 1, an example energy system 10 includes a data center (DaC) power system 20 that is configured to receive power input from fuel cell system 31, an on-site renewable generation system 50, and the local electrical power grid 12. The DaC power system 20 is an integrated system that provides power to the data center equipment, such as the computers, networking gear, and storage devices of the data center. The DaC power system 20 also provides power to cooling systems that are used to cool the data center equipment.

By having the DaC power system 20 provide power to the data center equipment and power for systems used to cool the data center equipment, and by integrating the cooling and electrical systems of the DaC power system 20 with the fuel cells 30, the capital expenditure required to implement the energy system may be reduced compared to conventional separate backup and primary power systems. The combined integrated DaC power system 20 and fuel cells 30 may also reduce the operating expenditure of the energy system 10 in comparison to conventional separate power systems.

The fuel cells 30 are a clean technology solution that fills the role that is typically performed by diesel generators in a conventional system. However, diesel generators are not zero-emission systems like the fuel cells 30. As such, fuel cells have a reduced carbon footprint compared to the diesel generators of conventional systems. The fuel cells 30 are fueled by on-site hydrogen storage 40, and batteries supporting fuel cells 30 may be integrated with other batteries used in the data center to power other data center equipment.

Figure 2:
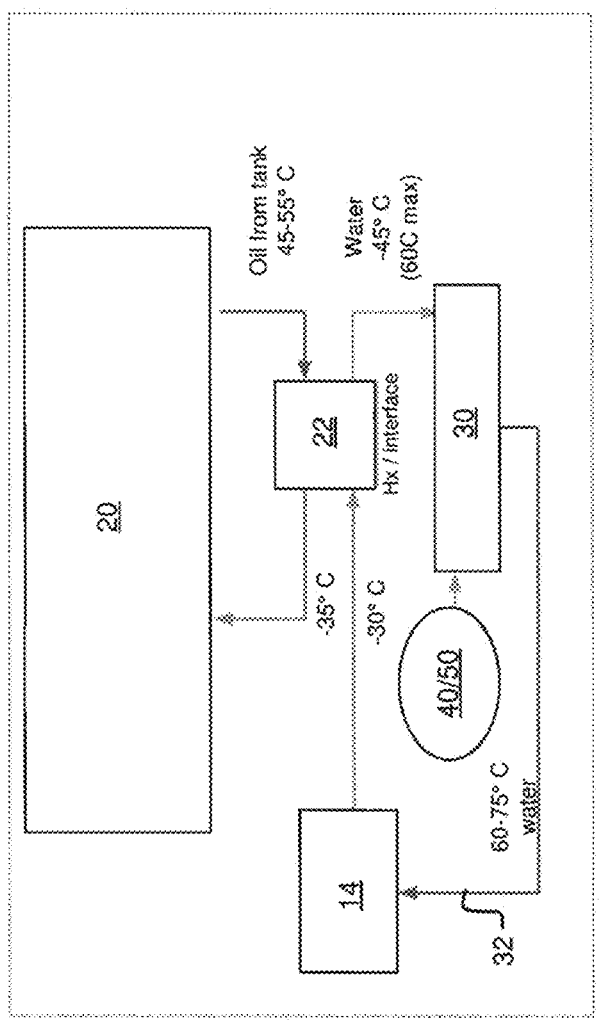
FIG. 2 shows a flowchart illustrating an exemplary heat recovery portion of the energy system of FIG. 1.

Some of the heat energy from the fuel cell system 31 may be output as conversion heat 33 that may be sent to an off-site location 14, such as for heating homes close to the energy system 10 or any other off-site system that could use excess heat energy from the energy system. Although FIG. 2 illustrates the heat energy from the fuel cell system 31 as being sent off-site, the heat energy may be kept on-site, such as for heating rooms, regeneration of power, desalination or carbon capture.

The fuel cells 30 may be stationary polymer electrolyte membrane (PEM) fuel cells. The fuel cells 30 may contain electrode plates. As hydrogen is fed through the plates, a chemical reaction may occur which produces a current. In other examples, the fuel cells 30 may use other technology, and other types of fuel may be used. Other types of fuel cells that may be used in this application include solid oxide fuel cells.

The fuel cells 30 may use energy from the on-site battery storage when they start operating. The fuel cells 30 may have an inverter to convert the DC power produced by the fuel cells to AC output which is required by the DaC power system 20.

The fuel cells 30 may receive energy input from an excess heat interface 22 (e.g., a heat exchanger) from the cooling water exiting the DaC power system 20. The fluid entering the excess heat interface 22 may be in the form of a hot liquid exiting the DaC power system 20 that can provide cooling to the fuel cells 30, because the hot liquid is cooler than the fuel cells.

The on-site battery storage may receive energy input from an on-site renewable energy generation system 50, from fuel cell system 31 and from the local electrical power grid 12. An on-site battery storage system (BESS) 32 may support fuel cell system 31 during startup and load transitions. BESS 32 may use, for example, Li-Ion LFP type batteries, although other types of batteries may be used in place of or in combination with Li-Ion LFP batteries. The BESS 32 may support the entire fuel cell system 31 output. However, the duration of support provided by the BESS 32 may be limited, and it may depend upon ramp-up time for fuel cell system 3 to produce its full power output to support DaC power system 20.

The hydrogen generation system 51 may include cryogenic liquid hydrogen that is expanded to a gas through an evaporator. Hydrogen liquid may be delivered via H2 delivery 16 to the energy system 10 to provide fuel for fuel cells 30 and for on-site hydrogen storage 40. If the on-site generation of hydrogen from the on-site hydrogen generation system 51 is insufficient for the needs of the fuel cells 30, on-site hydrogen storage system 40, may provide energy input to the fuel cells 30.

The on-site renewable energy generation system 50 may produce power for powering the DaC, as well as for powering the hydrogen generation system 51. The on-site renewable energy generation system 50 may include solar PV, wind, or geothermal power systems.

The fuel cells 30 may use their excess heat for carbon capture 60. The carbon capture 60 may also capture carbon from the atmosphere 62. In this regard, the carbon capture 60 may extract carbon from the air and distill it as liquid or gas carbon dioxide. The remaining heat energy from the excess heat interface 22 exiting the DaC power system 20 that is not provided to the fuel cells 30 may be provided to help accomplish carbon capture 60, which may be energy intensive.

The energy system 10 may have controls 70 that manage energy flows from the electrical power grid 12 to the DaC power system 20 and the on-site battery storage, from the fuel cells 30 to the DaC power system, and from the on-site renewable energy generation system 50 to the DaC power system. There may be individual controls for the fuel cell system 31, on-site battery storage (e.g., BESS 32), on-site renewable energy generation 50, and an overall top level control system for the DaC power system 20 which may manage the energy flow from each of these sources and from the grid.

One example of the fuel cells 30 receiving energy input from the excess heat interface 22 from the cooling water exiting the DaC power system 20 is further illustrated in FIG. 2. The DaC power system 20 may send cooling water to the excess heat interface 22 at an example temperature of 45-55° C. The cooling liquid exiting the DaC power system 20 may be in the form of oil, which can be used to heat water within the excess heat interface 22 to an example temperature of about 45° C. The heated water can be provided to the fuel cells 30, which heats the water to an example temperature of 60-75° C., and the conversion heat 33 that is output from the fuel cells may be sent to an off-site use 14. The water returning from the off-site use 14 may be at an example temperature of about 30° C., and that water may cool down the oil in the excess heat interface 22 to an example temperature of about 35° C. The cooler oil is then routed back to the DaC power system 20 to cool the DaC power system again, restarting the cycle.

Referring to FIG. 3, a method of cooling a data center will be described. The following operations do not have to be performed in the precise order described below. Rather, various operations can be handled in a different order or simultaneously, and operations may also be added or omitted. FIG. 3 illustrates a flow chart 100 showing an example operating method for the energy system 10.

In block 110, an energy system 10 may be provided, the energy system having a data center (DaC) power system 20, fuel cells 30, an on-site hydrogen storage 40, an on-site renewable energy generation system 50, and controls 70.

In block 120, the on-site renewable energy generation system 50 may provide energy to generate hydrogen to store in the on-site hydrogen storage 40 and also may provide energy to charge on-site batteries. In block 130, the on-site hydrogen storage 40 may provide energy to the fuel cells 30. In block 140, the fuel cells 30 may provide energy to the DaC power system 20. In block 150, the DaC power system 20 may simultaneously provide power for data center equipment to operate as well as power for cooling systems that are used to cool the data center equipment.

In block 160, the fuel cells cooling system may receive cooling input from the excess heat interface 22 from the DaC power system 20. In block 170, conversion heat 33 from the fuel cells 30 (or other components of the fuel cell system 31) may be sent to an off-site use 14. In block 180, the controls 70 may increase and/or throttle energy flows from the electrical power grid 12 to the DaC power system 20 and the on-site battery storage, from the fuel cells 30 to the DaC power system, and from the renewable energy generation system to the DaC power system.

In some examples, the method may include block 190, during which the local electrical power grid provides energy to the DaC power system 20 and the on-site battery storage. The method may optionally include block 200, during which hydrogen is delivered via delivery 16 to provide fuel for the on-site hydrogen storage 40. The method may optionally include block 210, in which the fuel cells 30 may use their excess for carbon capture 60, cooling fluid from the excess heat interface 22 generated from the DaC power system 20 that is not provided to the fuel cells 30 may help accomplish the carbon capture 60, and during which carbon may also be captured from the atmosphere 62.

The energy system 10 disclosed herein may be used in conjunction with various energy systems other than DaC power systems 20. For example, the energy system 10 may simultaneously provide power for other types of equipment to operate as well as power for cooling the other types of equipment.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the example implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. An energy system, comprising:
   data center computer equipment;
   a data center power system configured to simultaneously provide power for operation of the data center equipment and power for cooling the data center equipment;
   fuel cells configured to provide power to the data center power system;
   an on-site hydrogen storage to provide fuel for the fuel cells;

an on-site battery storage configured to provide backup power and power conditioning to the fuel cells; and an excess heat recovery connection configured to transfer a liquid from the data center power system to provide cooling to the fuel cells.

2. The energy system of claim 1, further comprising a renewable energy system configured to generate and provide hydrogen to the on-site hydrogen storage.

3. The energy system of claim 2, further comprising controls configured to increase or throttle energy flows from the fuel cells to the data center power system and from the renewable energy system to the data center power system.

4. The energy system of claim 1, wherein the excess heat recovery connection is configured to provide energy to a carbon capture system that is configured to capture carbon from the atmosphere.

5. The energy system of claim 1, wherein the on-site battery storage is integrated with other data center batteries that are configured to provide backup power to the data center computer equipment.

6. The energy system of claim 1, further comprising one or more inverters, transformers, or switch gear systems that are integrated with the data center power system and with the data center computer equipment.

7. The energy system of claim 1, wherein the excess heat recovery connection is configured to transfer heat energy to an off-site use outside of the energy system.

8. The energy system of claim 1, wherein the fuel cells are stationary polymer electrolyte membrane fuel cells.

9. The energy system of claim 1, wherein the energy system is configured to receive hydrogen for the on-site hydrogen storage from a delivery source outside of the energy system.

10. The energy system of claim 1, wherein the energy system is configured to receive primary electrical power for the data center power system from a local electrical power grid.

11. A method of cooling a data center, the method comprising:

providing an energy system having data center computer equipment, a data center power system, fuel cells, and an on-site battery storage;

the data center power system simultaneously providing power for operation of the data center equipment and power for cooling the data center equipment;

the fuel cells providing power to the data center power system;

an on-site hydrogen storage to provide fuel for the fuel cells and data center cooling through the expansion of liquid or gaseous hydrogen;

the on-site battery storage providing backup power and power conditioning to the fuel cells; and an excess heat recovery connection transferring a liquid from the data center power system to the fuel cells to cool the fuel cells.

12. The method of claim 11, wherein the energy system has a renewable energy system, the method further comprising the renewable energy system generating and providing power to a hydrogen generating system, the hydrogen generating system providing hydrogen to the on-site hydrogen storage.

13. The method of claim 12, wherein the energy system has controls, the method further comprising the controls increasing or throttling energy flows from the fuel cells to the data center power system or from the renewable energy system to the data center power system.

14. The method of claim 11, further comprising the excess heat recovery connection providing energy to a carbon capture system that captures carbon from the atmosphere.

15. The method of claim 11, wherein the on-site battery storage is integrated with other data center batteries that provide backup power to the data center computer equipment.

16. The method of claim 11, wherein the energy system has one or more inverters, transformers, or switch gear systems that are integrated with the data center power system and with the data center computer equipment.

17. The method of claim 11, further comprising the excess heat recovery connection transferring heat energy to an off-site use outside of the energy system.

18. The method of claim 11, wherein the fuel cells are stationary polymer electrolyte membrane fuel cells.

19. The method of claim 11, further comprising a hydrogen source outside of the energy system providing hydrogen to the on-site hydrogen storage.

20. The method of claim 11, further comprising a local electrical power grid providing primary electrical power simultaneously for operation of the data center equipment and cooling of the data center equipment.

* * * * *